(12) United States Patent
Bardosy et al.

(10) Patent No.: US 12,685,290 B1
(45) Date of Patent: Jul. 21, 2026

(54) AIR FORK FOR MILKING CLUSTER

(71) Applicant: Technologies Holdings Corp., Houston, TX (US)

(72) Inventors: Gregory S. Bardosy, Madison, WI (US); Anthony P. Spaeth, Boyd, WI (US); Steve Pretz, Westwood Hills, KS (US)

(73) Assignee: Technologies Holdings Corp., Houston, TX (US)

( * ) Notice: Subject to any disclaimer, the term of this patent is extended or adjusted under 35 U.S.C. 154(b) by 0 days.

(21) Appl. No.: 19/194,995

(22) Filed: Apr. 30, 2025

(51) Int. Cl.
*A01J 5/04* (2006.01)

(52) U.S. Cl.
CPC ..................................... *A01J 5/041* (2013.01)

(58) Field of Classification Search
CPC ...... A01J 5/041; A01J 5/02; A01J 5/04; A01J 5/044; A01J 5/048
USPC ........................ 119/14.01–14.3, 14.54, 14.55
See application file for complete search history.

(56) References Cited

U.S. PATENT DOCUMENTS 3,079,891 A    3/1963    Miller
3,776,196 A   12/1973    Luiz

| 4,530,307 | A | | 7/1985 | Thompson | |
| 4,537,152 | A | | 8/1985 | Thompson | |
| 5,178,095 | A | | 1/1993 | Mein | |
| 5,218,924 | A | | 6/1993 | Thompson | |
| 5,586,518 | A | * | 12/1996 | Carrano | A01J 5/041 |
| | | | | | 119/14.54 |
| 6,981,468 | B1 | * | 1/2006 | Steingraber | A01J 5/041 |
| | | | | | 119/14.54 |

FOREIGN PATENT DOCUMENTS

SU            1667753  A1      8/1991

* cited by examiner

*Primary Examiner* — Richard T Price, Jr.

(74) *Attorney, Agent, or Firm* — Andrus Intellectual Property Law, LLP

(57) ABSTRACT

An air fork for directing vacuum gas flow in a milking cluster includes two main tubes that each terminate in a respective one of two air divider tubes. The air divider tubes are each configured to connect the vacuum gas flow diagonally across the udder, with a first air divider tube connecting vacuum pulsation of the front right teat and the rear left teat together, and a second air divider tube connecting vacuum pulsation of the front left teat and the rear right teat together. The air divider tubes are configured to restrict air flow to the front teat cups compared to the rear teat cups so that the front teats are milked more slowly than the rear teats.

20 Claims, 10 Drawing Sheets

AIR FORK FOR MILKING CLUSTER

FIELD

The present disclosure generally relates to animal milking equipment, and more particularly to milking clusters.

BACKGROUND

A milking cluster is an assembly attached to the dairy animal's udder during milking. The cluster includes a claw, four shell assemblies, four short milk tubes, four air tubes, and an air fork. Each shell assembly includes an outer shell and an inner liner. The short milk tube connects the liner to the claw which in turn is connected to a milk transport hose subject to vacuum or negative pressure. The air tube connects the space between the liner and the shell to the air fork. The air fork is connected through one or more air lines to a pulsation device cycling vacuum off and on.

When milking a dairy animal, the inside bore of the liner is at the system vacuum level, and the space between the liner and the shell is either at vacuum or at atmospheric pressure depending on the cycle of the pulsation device. When there is atmospheric pressure on the outside of the liner in the space between the liner and the shell, the vacuum on the inside of the liner causes the liner to collapse. This is known as the rest phase, during which there is no milk flow, i.e., the liner is closed. When there is a vacuum on the outside of the liner in the space between the liner and the shell, such vacuum balances the vacuum on the inside of the liner, and the liner can relax or expand. This is the milk phase, during which milk flows, i.e. the liner is open.

The purpose of the air fork is to distribute the vacuum and atmospheric air pulses to the shells, to apply the cycling vacuum and atmospheric air pulses to the space between the liner and the shell. Pulsation systems are either simultaneous or alternating. Simultaneous means that all four teat cups will be in either the milk phase or the rest phase at the same time. Alternating pulsation systems will have two of the four teat cups in the milk phase and the other two teat cups in the rest phase, and then switch.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one aspect of the disclosure, an air fork for directing vacuum gas flow in a milking cluster includes two main tubes that each terminate in a respective one of two air divider tubes. The air divider tubes are each configured to connect the vacuum gas flow diagonally across the udder, with a first air divider tube connecting vacuum pulsation of the front right teat and the rear left teat together, and a second air divider tube connecting vacuum pulsation of the front left teat and the rear right teat together. The air divider tubes are configured to restrict air flow to the front teat cups compared to the rear teat cups so that the front teats are milked more slowly than the rear teats.

In another aspect of the present disclosure, an air fork is provided for a milking cluster for a dairy animal having an udder with four teats including a front right teat, a front left teat, a rear right teat, and a rear left teat. The air fork includes a first main tube extending along a longitudinal axis between a vacuum connection end configured to connect to a first main pulsation line and a second end that terminates in a first air divider tube. The first air divider tube is configured to connect between a front right teat cup on the front right teat and a rear left teat cup on the rear left teat to connect pulsation diagonally across the udder. The first air divider tube has a right restricted orifice configured to reduce air flow between the first main tube and the front right teat cup compared to air flow between the first main tube and the rear left teat cup. The air fork further includes a second main tube extending along the longitudinal axis between a vacuum connection end configured to connect to a second main pulsation line and a second end that terminates in a second air divider tube. The second air divider tube is configured to connect between a front left teat cup on the front left teat and a rear right teat cup on rear right teat to connect pulsation diagonally across the udder. The second air divider tube has a left restricted orifice configured to reduce air flow between the second main tube and the front left teat cup compared to air flow between the second main tube and the rear left teat cup.

In one embodiment, the restricted orifices are configured to cause a transition period between open and closed for each of the front right teat and the front left teat longer than a transition period between open and closed for each of the rear right teat and the rear left teat. Optionally, the transition period for the front right teat and the front left teat is at least 10% longer than the transition period for the rear right teat and the rear left teat. Optionally, the transition period for the front right teat and the front left teat is at least 20% longer than the transition period for the rear right teat and the rear left teat.

In one embodiment, a diameter of each of the first main tube, the first air divider tube, the second main tube, and the second air divider tube is generally equal to a first diameter.

In one embodiment, each of the right restricted orifice and the left restricted orifice has a diameter that is less than 60% of a diameter of at least one of the first main tube, the first air divider tube, the second main tube, and the second air divider tube.

In one embodiment, each of the right restricted orifice and the left restricted orifice has a diameter that is less than 55% of a diameter of at least one of the first main tube, the first air divider tube, the second main tube, and the second air divider tube.

In one embodiment, each of the right restricted orifice and the left restricted orifice has a diameter that is less than 50% of a diameter of at least one of the first main tube, the first air divider tube, the second main tube, and the second air divider tube.

In one embodiment, each of the right restricted orifice and the left restricted orifice has a diameter that is less than 45% of a diameter of at least one of the first main tube, the first air divider tube, the second main tube, and the second air divider tube.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
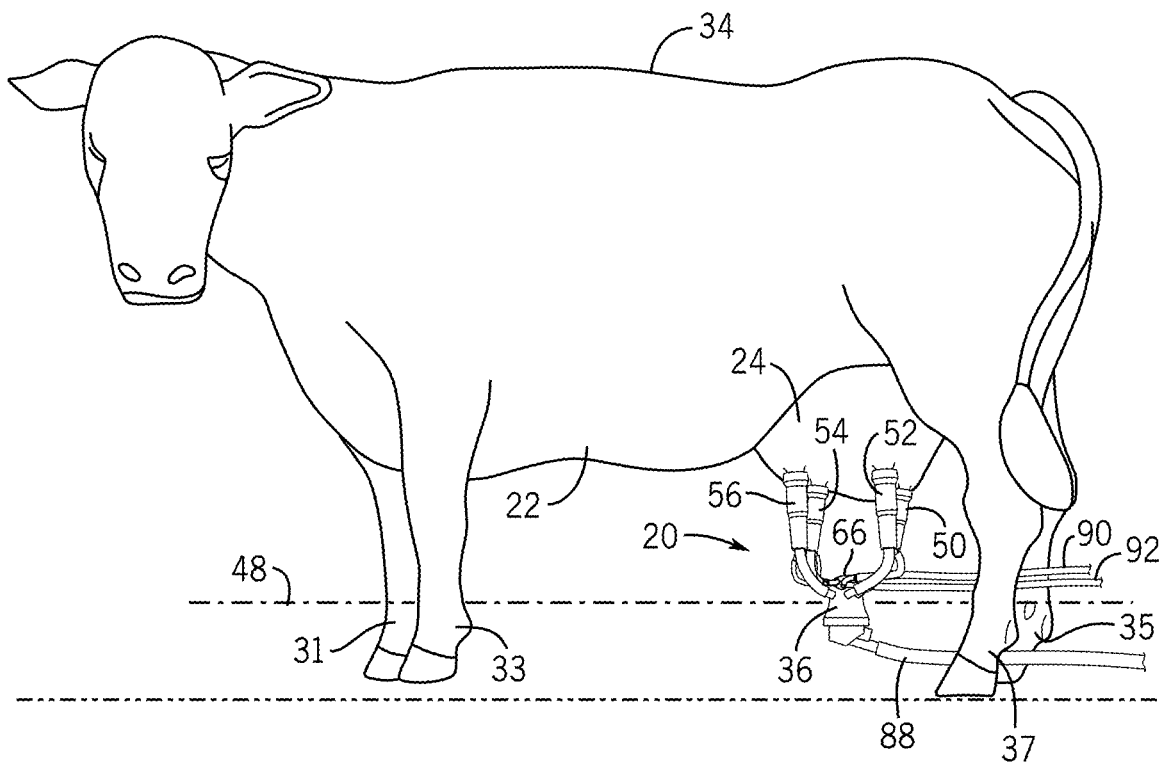
FIG. 1 is a side view of a milking cluster attached to a dairy animal, according to one embodiment of the present disclosure.

In the present description, certain terms have been used for brevity, clarity and understanding. No unnecessary limitations are to be inferred therefrom beyond the requirement of the prior art because such terms are used for descriptive purposes only and are intended to be broadly construed.

As used herein, unless otherwise limited or defined, discussion of particular directions is provided by example only, with regard to particular embodiments or relevant illustrations. For example, discussion of "top," "bottom," "front," "rear," "left," "right," "horizontal," "vertical," and "longitudinal" features and/or relative motion, e.g., movement "up" and "down," is generally intended as a description only of the orientation of such features relative to a reference frame of a particular example or illustration. Correspondingly, for example, a "top" feature may sometimes be disposed below a "bottom" feature (and so on), in some arrangements or embodiments. Additionally or alternatively, embodiments may be arranged in a different orientation such that "top" and "bottom" features are arranged horizontally relative to each other, for example in a "left-to-right" orientation.

The use herein of the terms "including," "comprising," or "having," and variations thereof, is meant to encompass the elements listed thereafter and equivalents thereof, as well as additional elements. Embodiments recited as "including," "comprising," or "having" certain elements are also contemplated as "consisting essentially of" and "consisting of" those certain elements.

Alternating pulsators are typically more desirable than simultaneous pulsators because alternating milking between two sets of teats provides more even milk flow and vacuum stability than milking all teats at the same time. The pulsing movement of the pulsator cycle massages the teat and includes a milking phase where milk is flowing and a rest phase where milk is not flowing, as well as an opening phase where the liner is transitioning from closed to open and a closing phase where the liner is transitioning from open to closed. There may be overlap between phases of the pulsator cycle. In the rest phase, the collapse of the liner squeezes the teat, forcing blood in the teat to circulate. Without this rest phase, blood would not circulate throughout the teat, and injury to the teat might result. Most milking clusters operate efficiently with pulsation rates between 45 and 60 cycles per minute.

Current alternating pulsators are typically arranged with the two front teats paired and the two back teats paired, wherein the pulsation cycles for the two teat pairs are run 180 out of phase with one another. Thus, when the two front teat cups are in the milk phase, the two rear teat cups are in the rest phase, and vice versa. Other existing alternating pulsators have the two right teats paired and the two left teats paired. Thus, when the two right teat cups are in the milk phase, the two left teat cups are in the rest phase, and vice versa. The inventors have recognized that these existing systems, which either milk front and back (where the front teats are paired and the back teats are paired) or side-to-side (where the right teats are paired together and the left teats are paired together) creates sway in the udders during milking, which is undesirable because it leads to increased liner slippage.

The inventors have also recognized that, in an alternating pulsation system, it is desirable to pair a front teat with a rear teat because it leads to more continuous and even milk flow between the milk phases of the alternating cycles and a more stable vacuum pressure. The rear teats of the dairy animal generally express more milk than the front teats. The inventors have recognized that front and back pairing (where the front teats are paired together and the back teats are paired) leads to a heavy milk flow during the milking phase of the back teats and a comparatively light flow during the milking phase of the front teats. This uneven milk flow can create problems with not maintaining a consistent milking pressure. It can also lead to overmilking the front teats because the front teats contain less milk and so they may be drained before the back teats are drained. Pairing a front teat with a rear teat leads to more even flow between milk phases of the two alternating sets of teats and provides opportunity for improved milking completion timing between the two sets of teats compared to side pairing.

The inventors developed the disclosed air fork in view of the above-described problems and challenges that they have recognized. The disclosed air fork diagonally links the front and back teats such that the front right teat is paired with the back left teat and the front left teat is paired with the back right teat. Thus, the front right teat and the back left teat are in the milk phase at the same time, and the front left teat and the back right teat are in the milk phase at the same time.

Additionally, the disclosed air fork is configured to restrict vacuum air flow to the front teat cups compared to the air flow to the front teat cups, and thus to milk the front teats at a slower rate than the rear teats. The air fork has restricted orifices leading to the front air tubes, thus the air flow for controlling the vacuum pressure in the front teat cups will be less than the air flow for controlling the vacuum pressure in the rear teat cups. By restricting air flow to the font air tubes, the pressure in the front teat cups changes more slowly and the liners are more sluggish in transitioning from the fully open to the fully closed phases. Thus, the milking phases of the pulsation cycle will be shorter and accordingly less milk will be expressed compared to the milking phases on the rear teats. This enables milking of the front and back teats to finish at approximately the same time.

Figure 2:
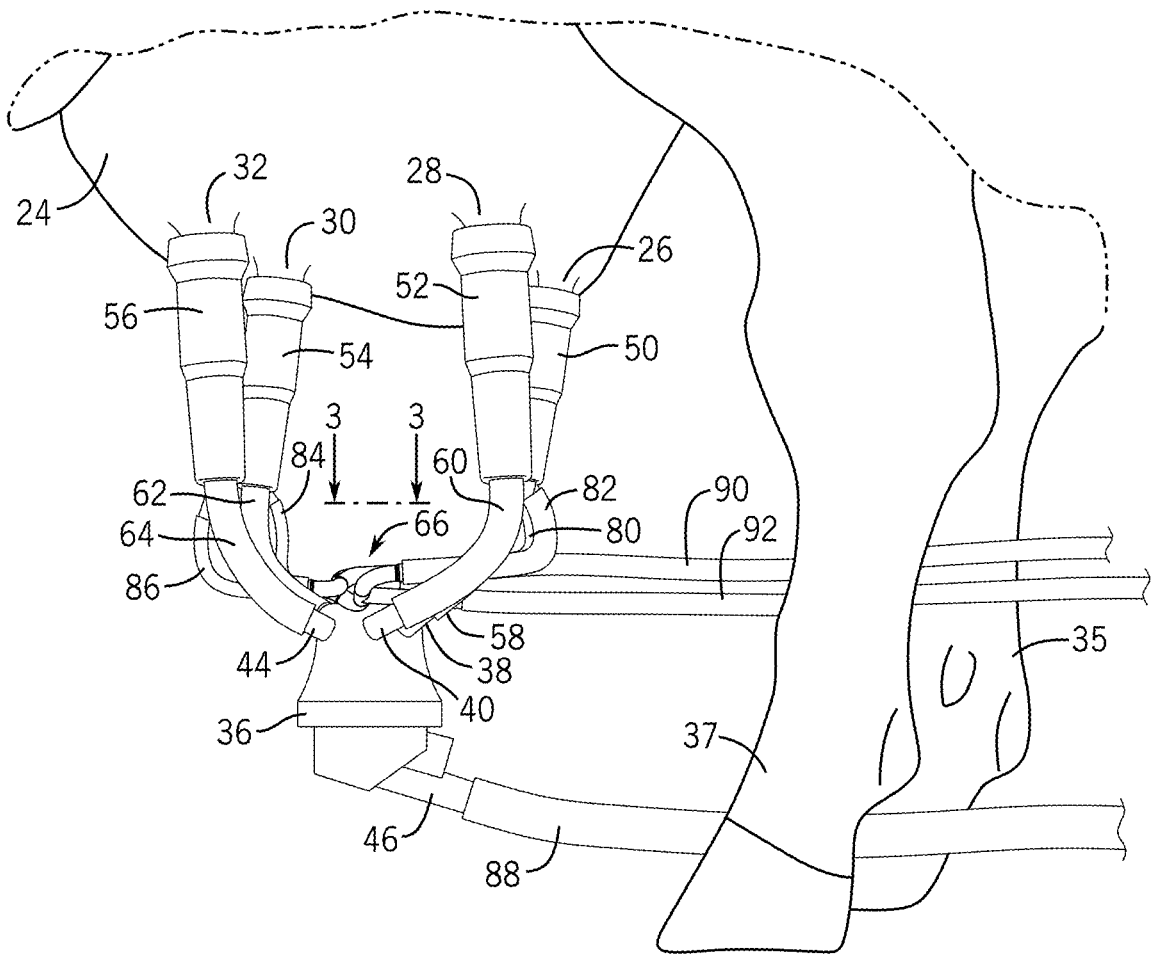
FIG. 2 is a closer view of the milking cluster attached to the dairy animal that is shown in FIG. 1.
Figure 3:
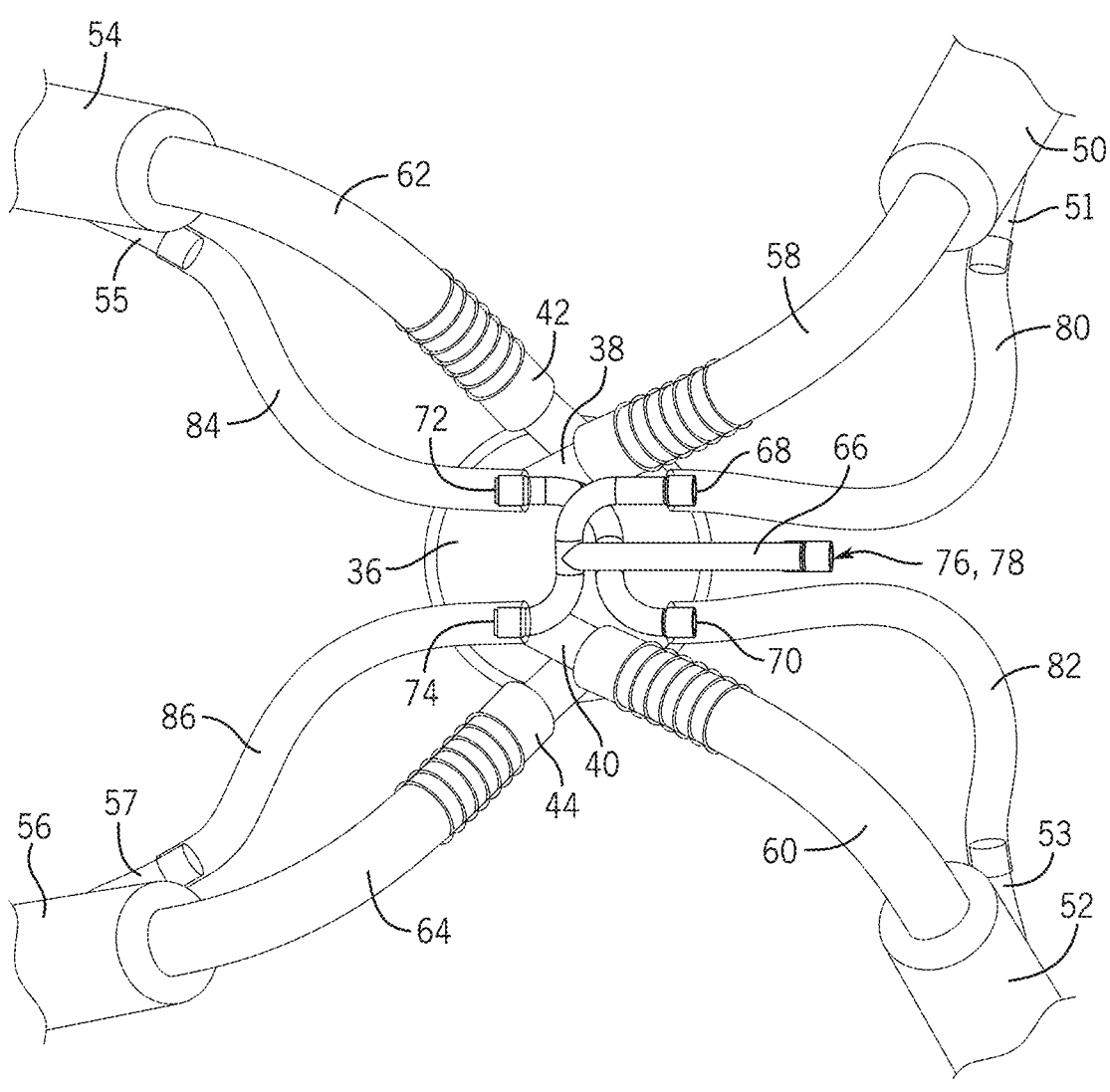
FIG. 3 is a top view of the milking cluster shown in FIG. 2.
Figure 4:
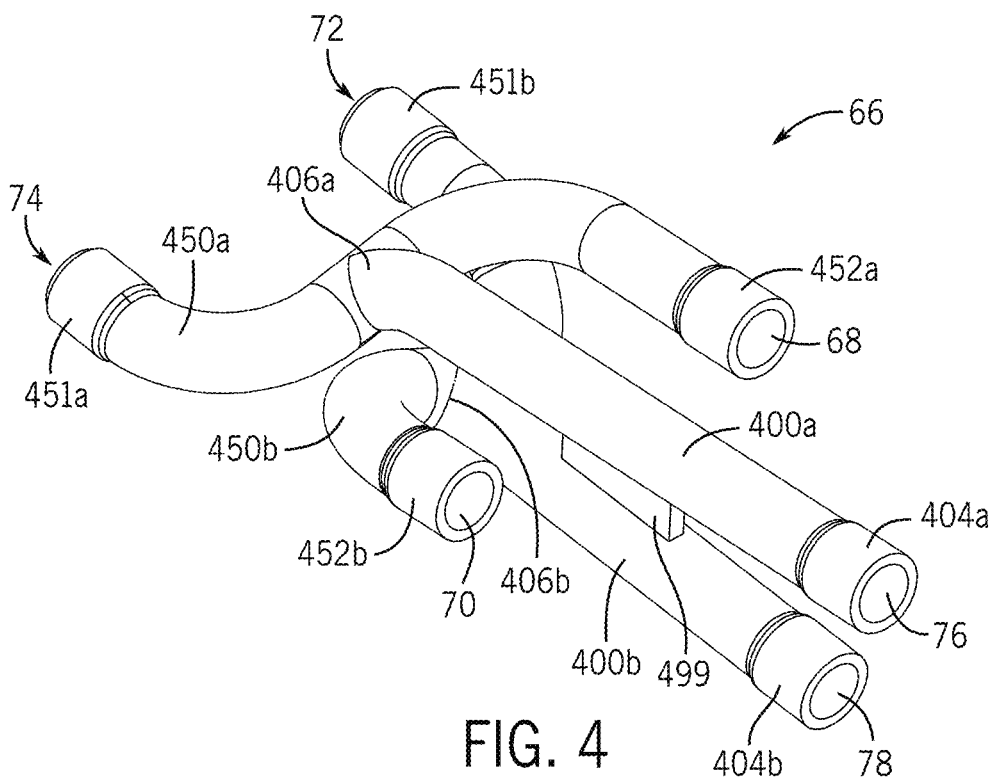
FIGS. 4 and 5 are perspective views of an air fork for a milking cluster according to one embodiment of the present disclosure.
Figure 5:
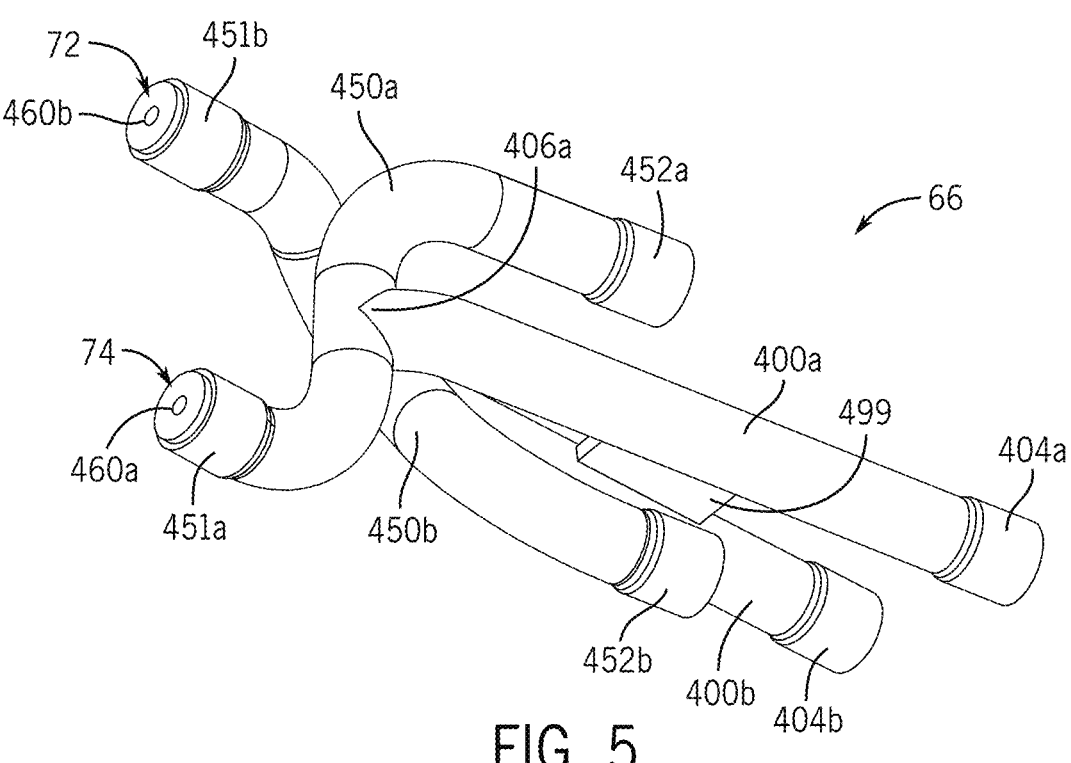

FIGS. 1-2 show a milking cluster 20 for a dairy animal 22, such as a cow, having an udder 24 and a plurality of teats 26, 28, 30, 32. The animal has a backbone 34 defining an axially extending longitudinal direction. A milking claw 36 has a plurality of inlets 38, 40, 42, 44, and an outlet 46. The claw 36 lies along a central longitudinal axis 48 extending between the animal's front legs 31 and 33 and between the animal's rear legs 35 and 37 and generally parallel to backbone 34. Teat cups 50, 52, 54, 56 are each connected to a respective teat 26, 28, 30, 32 of udder 24. Short milk hoses 58, 60, 62, 64 each connect a respective claw inlet to a respective teat cup. Referring also to FIG. 3, which is a top view of the milking cluster, an air fork 66 has air tube ports 68, 70, 72, 74, and one or more pump ports 76, 78. Air tubes 80, 82, 84, 86 each connect a respective air tube port 68, 70, 72, 74 to a respective air port 51, 53, 55, 57 on one of the teat cups 50, 52, 54, 56. One or more main pulsation lines 90, 92 are connected to respective pump ports 76, 78.

A milk hose 88 is connected to claw outlet 46. In herringbone type and other conventional milking parlors, it is typical that milk hose 88 and main pulsation lines 90, 92 extend laterally to the side of the dairy animal 22. In other conventional milking arrangements, the milk hose 88 and/or the main pulsation lines 90, 92 may extend longitudinally rearwardly along axis 48 between the cow's rear legs 35 and 37. In still other milking arrangements, the milk hose 88 and/or the main pulsation lines 90, 92 may extend longitudinally forwardly along axis 48 between the cow's front legs 31 and 33.

The milking arrangement shown herein is of the above-noted alternating pulsation type. While vacuum is applied through main pulsation line 92, atmospheric air pressure is applied through main pulsation line 90, and vice versa. As is best shown in FIG. 3, the air fork 66 is configured to guide the vacuum pulse to two teats that are diagonally positioned across the udder 24. Namely, the air fork 66 is configured to guide air from the pain pulsation line 90 to the front left air tube 86 connected to the front left teat cup 56 and the rear right air tube 80 connected to the rear right teat cup 50. Thus, the liners in each of the front left teat cup 56 and the rear right teat cup 50 are pulsed together, causing the front left teat 32 and the rear right teat 26 to be in the milking phase together. The expressed milk flows through milk hoses 64 and 58 into the claw 36, which then gets discharged through outlet 46 and out through milk hose 88 (FIG. 2). Similarly, the air fork 66 is configured to guide air from the pain pulsation line 92 to the front right air tube 84 connected to the front right teat cup 54 and the rear left air tube 82 connected to the rear left teat cup 52. Thus, the liners in the front right teat cup 54 and rear left teat cup 52 are pulsed together, causing the front right teat 30 and the rear left teat 28 to be in the milking phase together. The expressed milk flows through milk hoses 62 and 60 into the claw 36, which then gets discharged through outlet 46 and out through milk hose 88 (FIG. 2).

Figure 13:
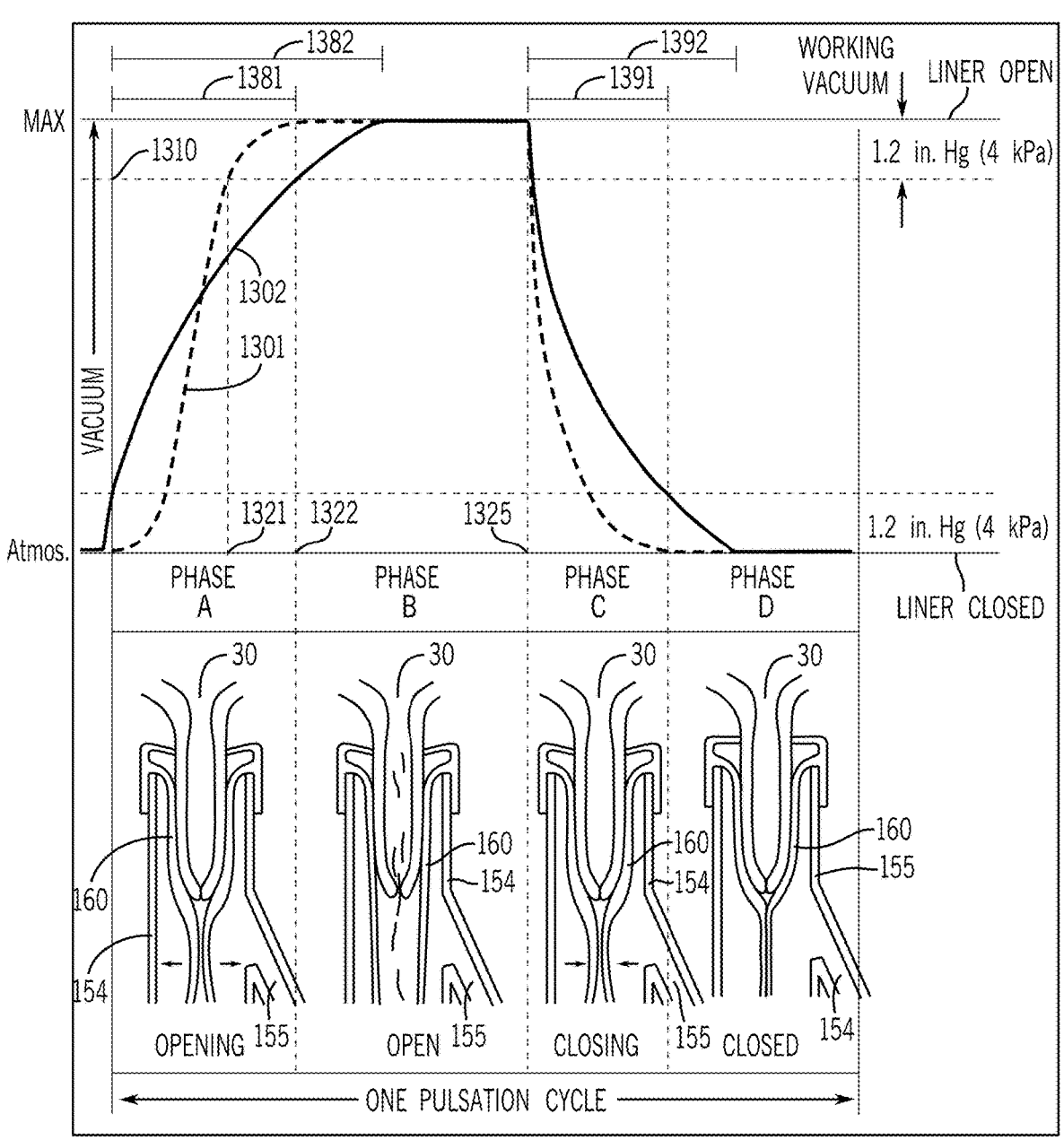
FIG. 13 is a chart shown an exemplary pulsation cycle according to the present disclosure.

FIG. 13 shows an exemplary pulsation cycle, which includes four phases, phase A through phase D. The figure shows a liner 160 inside a teat cup 154. The liner 160 surrounds a teat 30 and maintains a seal therewith. Vacuum pressure is maintained on the inside of the liner. The pressure inside of the teat cup 154 outside of the liner 160 is controlled by the pulsator. Gasses are transferred from the pulsator into and out of the teat cup 154 via the air port 155, which connects to an air tube that connects through the air fork and a main pulsation line to the pulsator. The liner 160 forms a seal around the top of the teat cup 154, thus enabling maintenance and control of the pressure in the teat cup 154 by the pulsator. The depicted pulsation cycle starts and ends with the liner in the fully closed, or collapsed, position. The figure delineates four general phases of the pulsation cycle, which in practice may overlap in time and/or may lengthen or shorten depending on the air flow rate to and from the teat cup 154, the maximum vacuum pressure, etc.

Phase D is the "closed" phase wherein the inside of the teat cup 154 is at atmospheric pressure. Since vacuum pressure is always maintained in the liner 160, the outside pressure in the teat cup 154 is greater than the pressure within the liner 160 causing it to collapse inward, squeezing the teat 30. This blocks milk flow and also squeezes and massages the teat to force blood circulation. This is often referred to as the rest phase. Phase A follows, which is referred to here as the "opening" phase, where air is removed out of the teat cup 154 until a maximum vacuum pressure is reached inside the teat cup 154. At the start of Phase A, the inside of the teat cup 154 is at atmospheric pressure, and during Phase A the pressure on the inside of the teat cup 154 decreases, thus increasing the pressure differential (vacuum pressure) between the inside and outside of the teat cup 154. The maximum vacuum pressure on the inside of the teat cup 154 is a lower pressure than the vacuum pressure inside of the liner 160, and thus the liner 160 is pulled outward towards the outer edges of the teat cup 154. Phase B follows, which is referred to in the figure as the "open" phase and is often referred to as the milking phase because it is the phase of the cycle where milk flows from the teat 30. In phase B, the maximum vacuum pressure is maintained. In Phase C, air is let back into the teat cup 154 to transition the inside of the cup back to atmospheric pressure. During this phase, which is referred to in the figure as the "closing phase," the pressure increase within the teat cup 154 collapses the liner 160 back to the closed position. Alternation between vacuum and atmospheric air pressure states within the teat cup 154, and thus between the open and closed positions of the liner 160, typically occurs at a pulsation rate between 45 and 70 cycles per minute.

FIGS. 4-9 provide various views of one embodiment of the disclosed the air fork 66. The air fork 66 includes two sections, each configured to drive pulsation to diagonally positioned teats. Each section has a main tube 400a and 400b. Each main tube 400a, 400b has a vacuum connection end 404a, 404b configured to connect to a main pulsation line (90, 92 in FIGS. 1 and 2) and a second end 406a, 406b that terminates in a respective air divider tube 450a, 450b. The main tubes 400a, 400b are connected together by a rigid spacer bar 499 configured to hold the main tubes 400a, and 400b in a relative position to one another. The air fork 66 may be formed of any rigid material. In one embodiment, the air fork 66 is made of metal, such as stainless steel tubing welded together at the connections.

The air divider is configured to divide air flow in two directions that are generally diagonal from one another—i.e., front right and rear left, or front left and rear right. Each air divider tube 450a, 450b has a front air tube connector end 451a, 451b that connects to one of the front air tubes 84 or 86 and a rear air tube connector 452a, 452b that connects to one of the rear air tubes 80 or 82. The front air tube connectors 452a, 452b have air tube ports 72, 74 with a restricted orifice 460a, 460b that is smaller than the opening of the rear air tube ports 68, 70. The restricted orifice 460a, 460b is configured to reduce air flow between the main tube 400a, 400b and the front air tube 84, 86, and thus to the front teat cup 54, 56. Thus, the air fork 66 is configured to direct more air flow to the rear teat cup 50, 52 than to the front teat cup 54, 56 such that the air flow to the rear teat cups 50, 52 is faster than the air flow to the front teat cups 54, 56.

The reduction in air flow caused by the restricted orifices 460a and 460b at the front air tube ports 72, 74 reduces the speed at which the liner moves between the open and closed positions, and thus lengthens the transition period of the pulsation cycle, which is the amount of time it takes the liner to move between the fully open position and the fully closed position. The graph in FIG. 13 depicts the vacuum pressure in the teat cup over the time of the pulsation cycle. When the vacuum pressure in the teat cup 154 is zero (i.e., atmospheric pressure), then the liner is fully closed. When the vacuum pressure in the teat cup 154 is at a maximum, the liner is fully opened. Line 1301 depicts the vacuum pressure in the rear teat cups and line 1302 depicts the vacuum pressure in the front teat cups over time. As can be seen by comparing lines 1301 and 1302, the pressure in the front teat cups (line 1302) rises more slowly between atmospheric pressure and the maximum vacuum pressure. Transition periods 1381 and 1382 are the transition periods for going from closed to open, and transition periods 1391 and 1392 are the transition periods for going from open to closed. The transition periods 1382, 1392 for the front teat cups are longer than the transition periods 1381, 1391 for the rear teat cups. In one embodiment, the transition periods 1382, 1392 for the front teat cups is at least 10% longer than the transition periods 1381, 1391 for the rear teat cups. In another embodiment, the transition periods 1382, 1392 for the front teat cups is at least 20% longer than the transition periods 1381, 1391 for the rear teat cups. In one exemplary implementation, the transition periods 1382, 1392 for the front teat cups is about 150 ms and the transition periods 1381, 1391 for the rear teat cups is about 125 ms.

Accordingly, the milk flows from the front teats for less time than it does from the rear teats. The milk flow portion of the pulsation cycle starts when the pressure in the teat cup passes the working vacuum threshold 1310. In the depicted example, the working vacuum is the top 4 kPa of vacuum pressure, which is when the liner is substantially in the open position. The vacuum pressure in rear teat cups reaches the vacuum threshold 1310 at time 1321 in the pulsation cycle, which is before the time 1322 when the vacuum pressure in the front teat cups. The air flow from the pulsator switches at time 1325 in the pulsation cycle, and the pressure in both the front and back teat cups drops below the working vacuum threshold 1310 quickly such that the milk flow out of the teat substantially stops.

Figure 8:
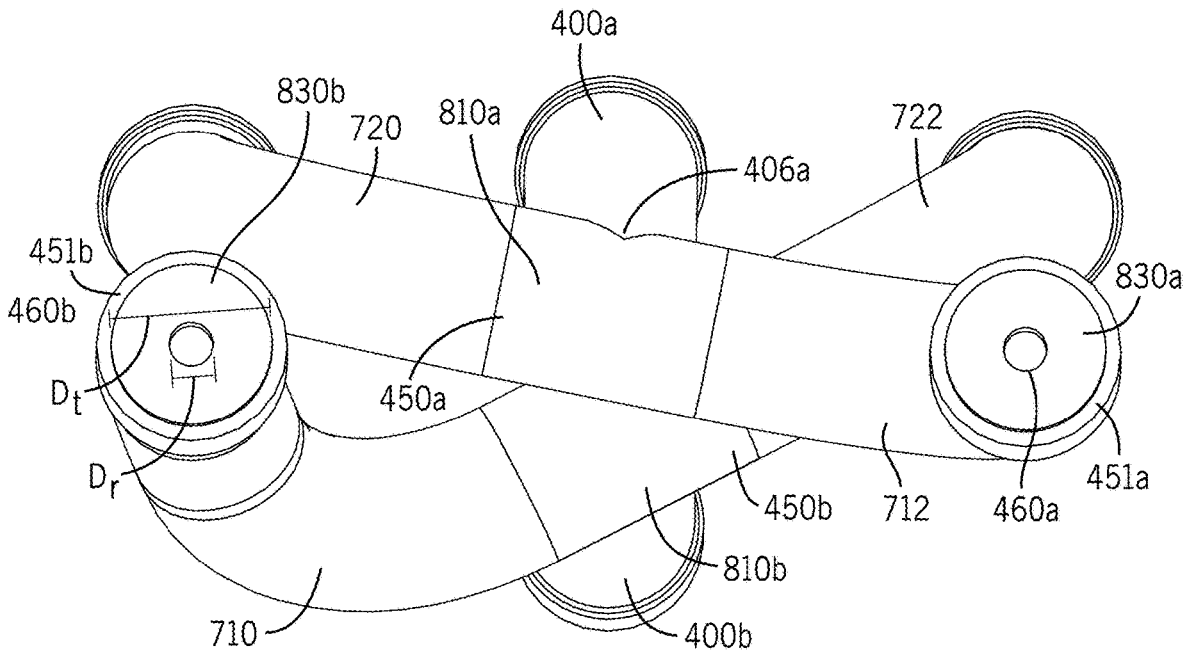
FIG. 8 is a front view of the embodiment of the air fork shown in FIGS. 4-7.
Figure 9:
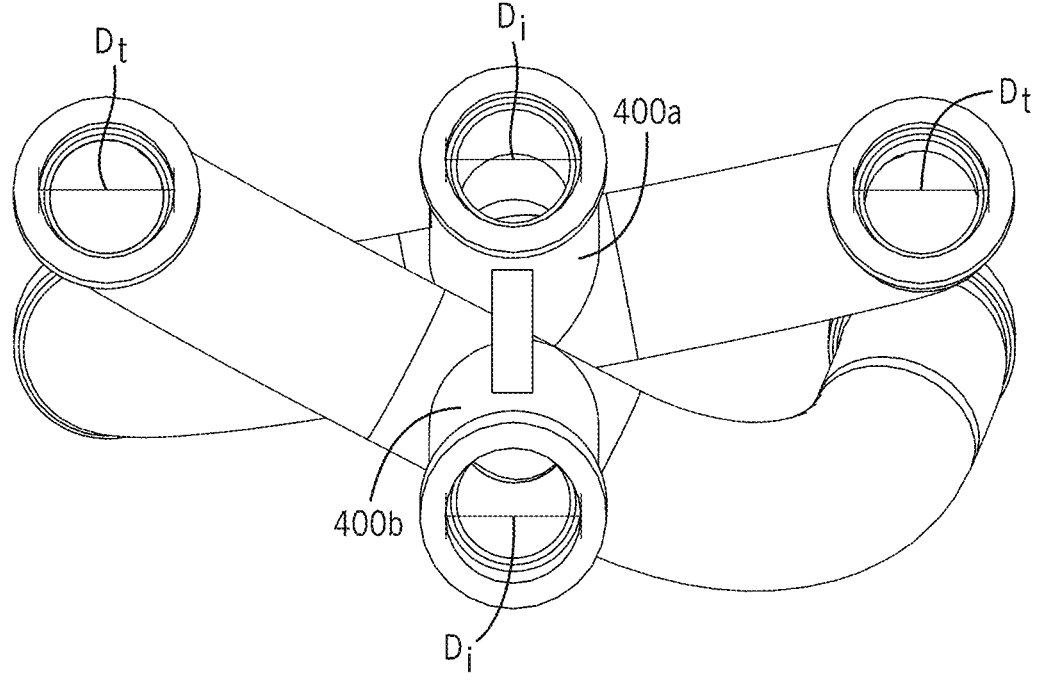
FIG. 9 is a rear view of the embodiment of the air fork shown in FIGS. 4-8.

As shown most clearly in FIGS. 8 and 9 depicting front and back views of the air fork, a diameter Dr of the restricted orifices 460a, 460b on the front air tube connectors 451a, 451b is substantially smaller than the diameter Dt of the air divider tubes 450a, 450b. Likewise, diameter Dr of the restricted orifices 460b is substantially smaller than the diameter Di of each of the main tubes 400a and 400b. In the depicted embodiment, the diameter Dt of the air divider tubes 450a, 450b is substantially equal to the diameter Di of the main tubes 400a, 400b. In many implementations, the diameter Dr of the restricted orifices 460a, 460b is less than 60% of the diameter Dt of the air divider tubes 450a, 450b and the diameter Di of the main tubes 400a, 400b. In some embodiments, the diameter Dr of the restricted orifices 460a, 460b is less than 50% of the diameter Dt of the air divider tubes 450a, 450b and the diameter Di of the main tubes 400a, 400b. In further embodiments, the diameter Dr of the restricted orifices 460a, 460b is less than 45% of the diameter Dt of the air divider tubes 450a, 450b and the diameter Di of the main tubes 400a, 400b. In further embodiments, the diameter Dr of the restricted orifices 460a, 460b is less than 40% of the diameter Dt of the air divider tubes 450a, 450b and the diameter Di of the main tubes 400a, 400b. In the depicted example, the diameter Dr of the restricted orifices 460a, 460b is 2.5 cm and the diameter Dt of the air divider tubes 450a, 450b is 5.95 cm.

In one embodiment, the restricted orifices 460a, 460b are formed by a plate 830a, 830b covering the respective front air tube connector ends 451a, 451b. For example, the plates 830a and 830b may be formed of the same metal material as the rest of the air fork and may be welded in place to cover the connector ends that connect to the front air tubes. Each plate 830a, 830b has a hole in the center, which is the restricted orifice having the above-described restricted diameter. Alternatively, the plates 830a and 830b may form multiple smaller holes, such as a grate. In some such embodiments, the total area of the smaller holes is within the above-described limitations and/or restricts the air flow as described herein.

Figure 7:
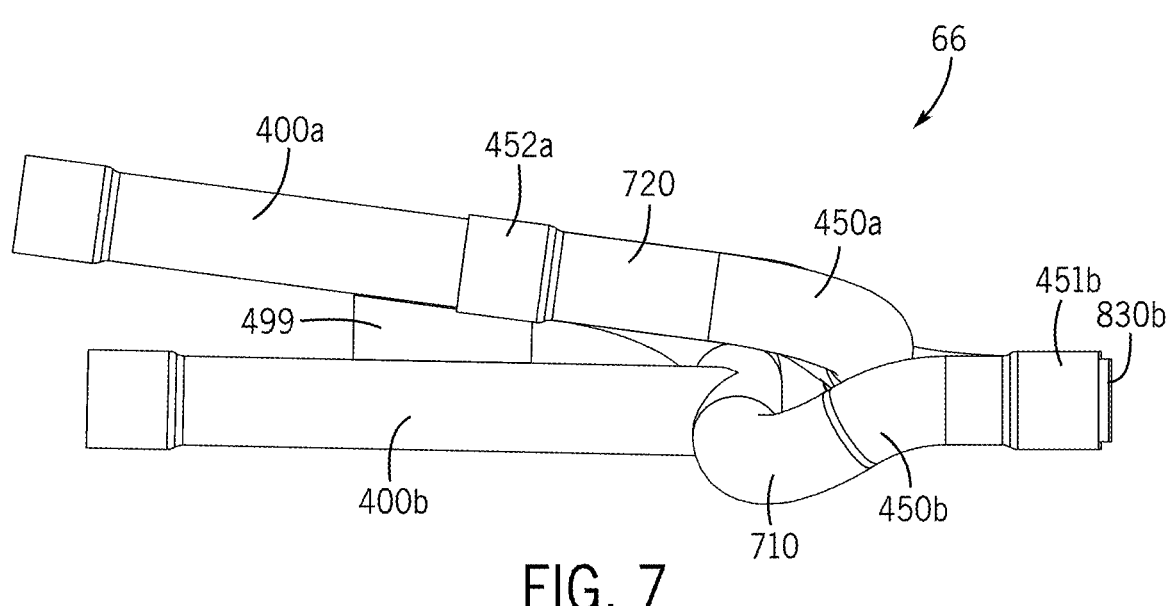
FIG. 7 is a side view of the embodiment of the air fork shown in FIGS. 4-6.

The air divider tubes 450a, 450b are configured to divide the air flow into two flow paths that are perpendicular across the udder, as is described above. In the depicted embodiment, the air divider tubes 450a, 450b extend generally perpendicular to the main tubes 400a, 400b at the connection location 810a, 810b. Thus, in the area of the connection location 810a, 810b the end 406a, 406b of the main tube 400a, 440b is approximately perpendicular to the air divider tubes 450a, 450b. The main tubes 400a, 400b are generally straight with their lengths running front to back along the longitudinal axis 48 (FIG. 1). However, as is best shown in FIG. 7, the main tubes 400a, 400b may be mounted at an angle with respect to one another, where the vacuum connection ends 404a, 404b are furthest apart and the main tubes 400a, 400b get closer together towards the front end. The spacer bar 499 is shaped with a taper accordingly and is rigidly connected to each of the main tubes 400a, 400b so as to maintain their relative position, with main tube 400a above main tube 400b. The top main tube 400a has a length MLa that is longer than the length MLb of main tube 400b, which enables the front end of main tube 400a to extend in front of the font end of main tube 400b (see also FIG. 8, which is a front view showing the relative position of the connection sections 810a and 810b).

Figure 6:
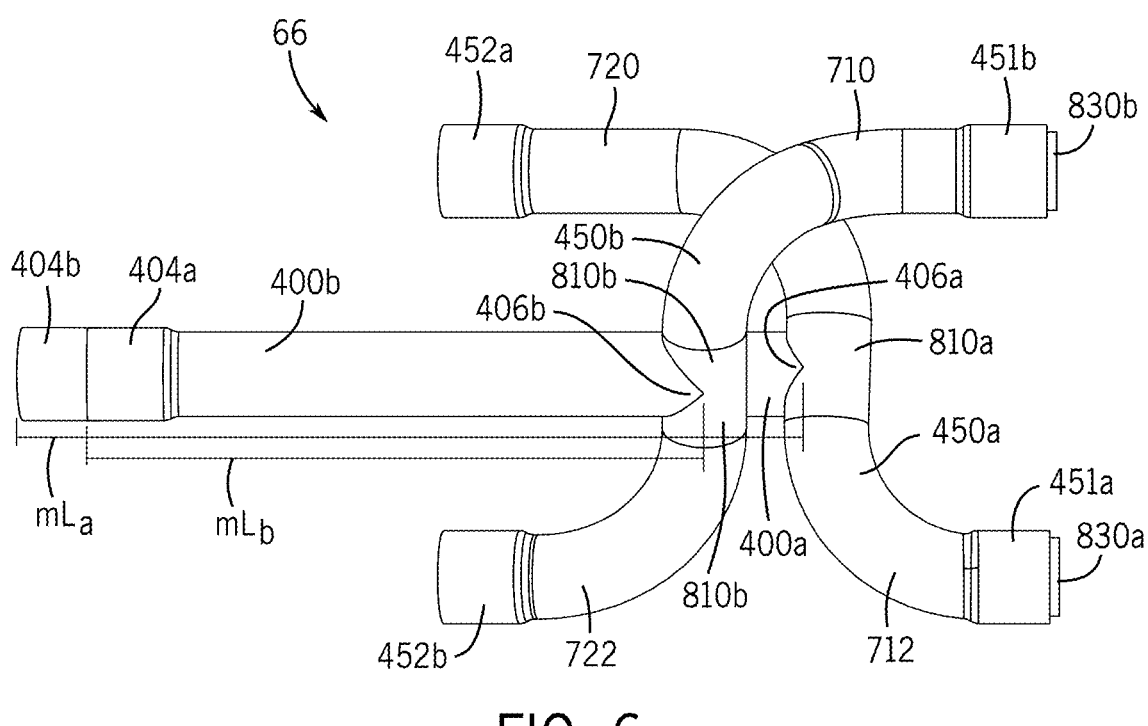
FIG. 6 is a bottom view of the embodiment of the air fork shown in FIGS. 4 and 5.

The air fork 66 configured such that the air divider tubes 450a, 450b are roughly in the same plane as one another and provide parallel connection points to the two front air tubes and the two rear air tubes. Each air divider tube 450a, 450b has two sides, referred to here as short tubes, including a front short tube and a rear short tube. FIG. 6 provides a bottom view showing the short tube configuration. In the depicted configuration, the top air divider tube 450a has a front left short tube 712 and a rear right short tube 720. The bottom air divider tube 450b has a front right short tube 710 and a rear left short tube 722. Since the connection location 810a of the top air divider tube 450a is in front of the connection location 810b of the air divider tube 450b, the rear short tube 720 is longer than the rear short tube 722 so that the rear short tubes 720, 722 terminate at horizontally parallel locations along the length of the air fork 66. The bottom air divider tube 450b has the opposite configuration since it is positioned rearward, with the front short tube 710 being longer than the rear short tube 720 so that the front short tube 710 extends far enough forward such that its front end is horizontally parallel with front short tube 712.

Figure 10:
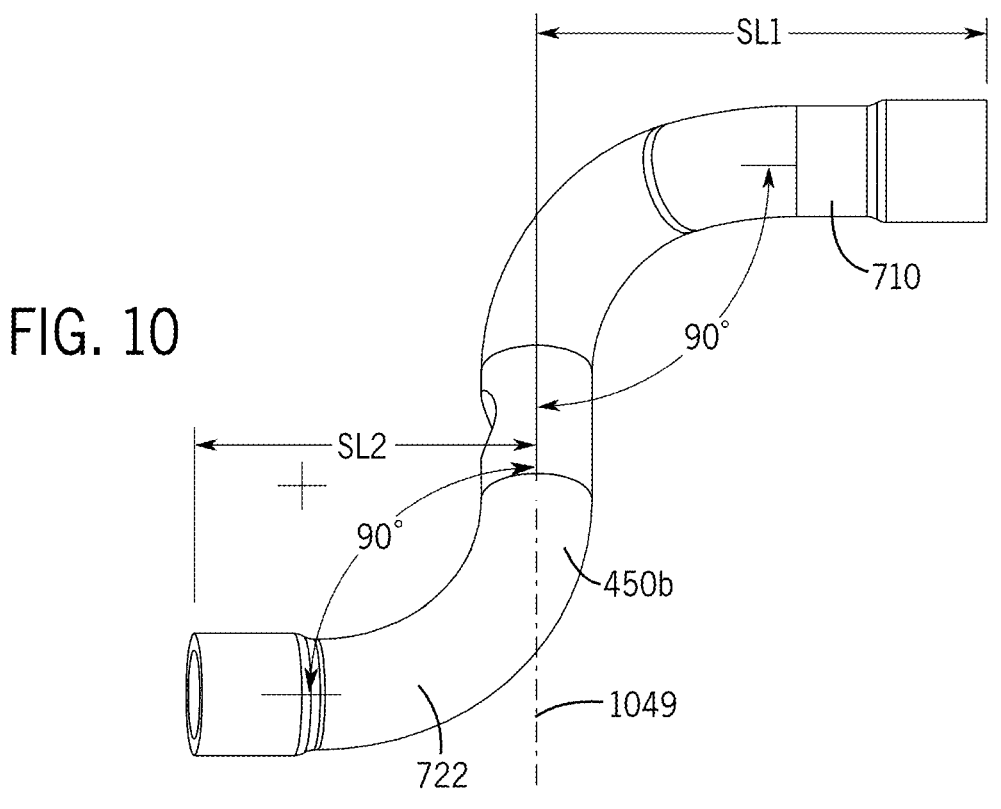
FIGS. 10-12 are views of an exemplary air divider tube for an air fork according to an embodiment of the disclosure.
Figure 11:
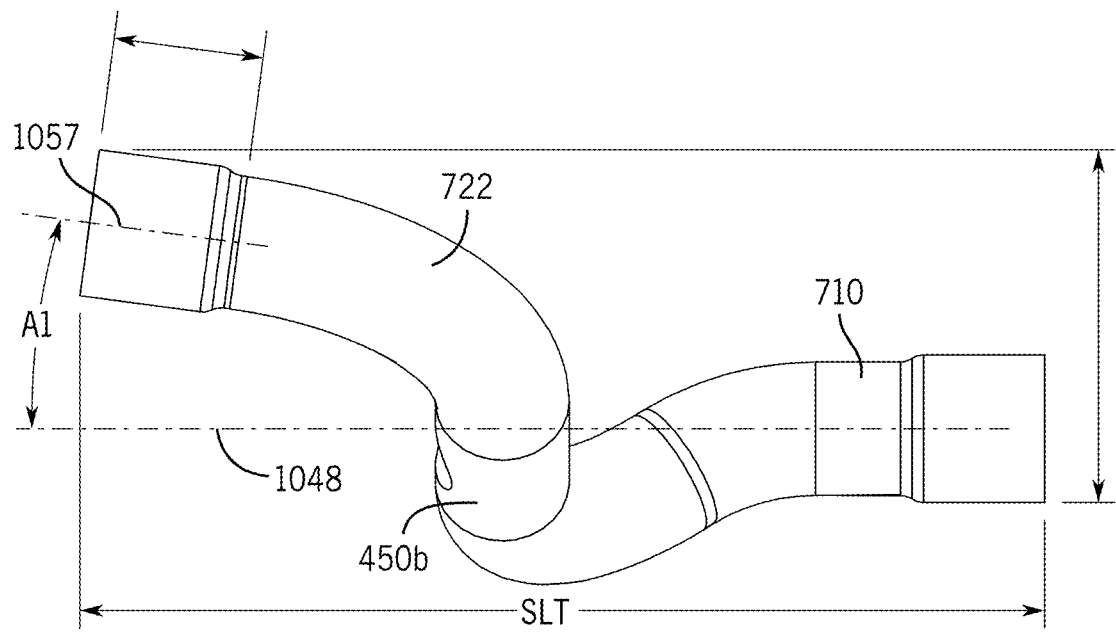
Figure 12:
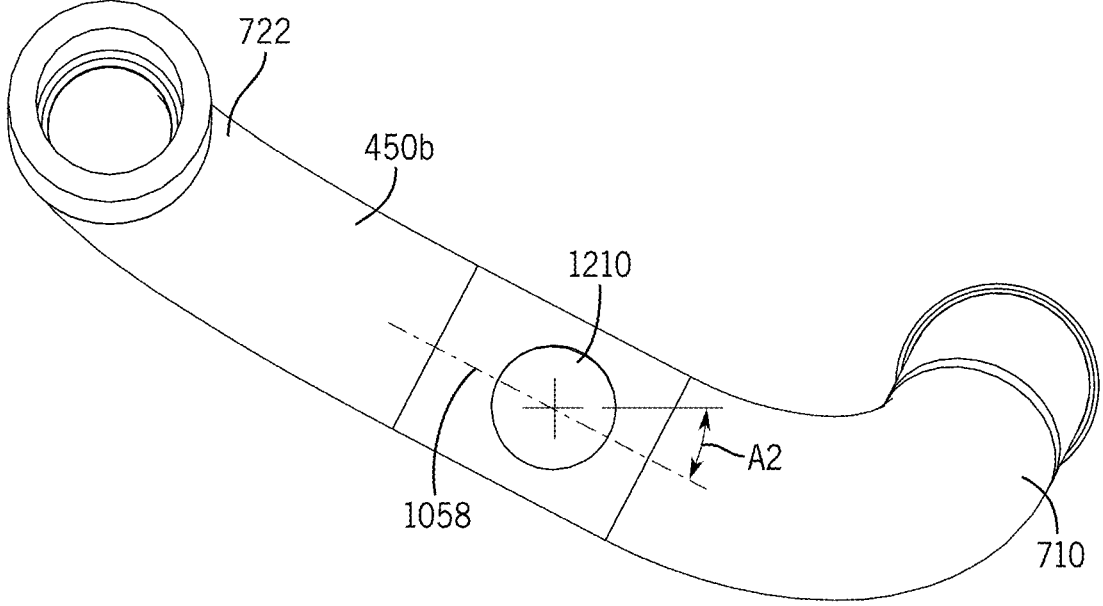

FIG. 10-12 show views of the bottom air divider tube 450b, which has a longer front short tube 710 than rear short tube 722. The front short tube 710 extends forward from the horizontal axis 1049 by length SL1. The rear short tube 722 extends backward from the horizontal axis by length SL2. Length SL1 is greater than length SL2, and the two lengths added together equal length SLT. The top air divider tube 450a has the opposite configuration, where the rear short tube 720 has longer length SL1 and the front short tube has shorter length SL2, where the two values also total SLT. Each short tube 710, 722 starts out parallel with the horizontal axis 1049, which is perpendicular to the longitudinal axis 48 (FIG. 1) and makes a 90 degree bend such that each short tube 710, 722 ends up generally parallel to the longitudinal axis 48.

As illustrated in FIG. 11, the short tube 450*b* is configured such that the front short tube 710 curves up such that the center axis 1048 of the front short tube 710 is at angle A1 compared to the center axis 1051 of the rear short tube 722. For example, the angle A may be 8 degrees, or otherwise a value that is within range of 10 degrees. The top air divider tube 450*a* has generally the opposite configuration, where the rear short tube 720 is longer and curves down. The air divider tubes 450*a*, 450*b* may be at angles with respect to the horizontal axis 1049 to provide generally co-planar connection points to the two front air tubes and the two rear air tubes. As is shown in FIG. 12, the center axis 1058 of the air divider tube 450*b* is at angle A2 with respect to horizontal.

This written description uses examples to disclose the invention(s), including the best mode, and also to enable any person skilled in the art to make and use the invention(s). Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention(s) is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. An air fork for a milking cluster for a dairy animal having an udder with four teats including a front right teat, a front left teat, a rear right teat, and a rear left teat, the air fork comprising:
   a first main tube extending along a longitudinal axis between a vacuum connection end configured to connect to a first main pulsation line and a second end that terminates in a first air divider tube;
   wherein the first air divider tube is configured to connect between a front right teat cup on the front right teat and a rear left teat cup on the rear left teat to connect pulsation diagonally across the udder;
   wherein the first air divider tube has a right restricted orifice configured to reduce air flow between the first main tube and the front right teat cup compared to air flow between the first main tube and the rear left teat cup;
   a second main tube extending along the longitudinal axis between a vacuum connection end configured to connect to a second main pulsation line and a second end that terminates in a second air divider tube;
   wherein the second air divider tube is configured to connect between a front left teat cup on the front left teat and a rear right teat cup on rear right teat to connect pulsation diagonally across the udder; and
   wherein the second air divider tube has a left restricted orifice configured to reduce air flow between the second main tube and the front left teat cup compared to air flow between the second main tube and the rear right teat cup.

2. The air fork of claim 1, wherein the restricted orifices are configured to cause a transition period between open and closed for each of the front right teat and the front left teat longer than a transition period between open and closed for each of the rear right teat and the rear left teat.

3. The air fork of claim 2, wherein the transition period for the front right teat and the front left teat is at least 20% longer than the transition period for the rear right teat and the rear left teat.

4. The air fork of claim 1, wherein a diameter of each of the first main tube, the first air divider tube, the second main tube, and the second air divider tube is generally equal to a first diameter, wherein each of the right restricted orifice and the left restricted orifice has a diameter that is less than 60% of the first diameter.

5. The air fork of claim 1, wherein a diameter of each of the first main tube, the first air divider tube, the second main tube, and the second air divider tube is generally equal to a first diameter, wherein each of the right restricted orifice and the left restricted orifice has a diameter that is less than 45% of the first diameter.

6. The air fork of claim 1, wherein the first air divider tube includes a front right short tube configured to connect between the first main tube and a front right air tube attached to the front right teat cup and a rear left short tube configured to connect between the first main tube and a rear left air tube attached to the rear left teat cup;
   wherein the right restricted orifice is in the front right short tube;
   wherein the second air divider tube includes a front left short tube configured to connect between the second main tube and a front left air tube attached to the front left teat cup and a rear right short tube configured to connect between the second main tube and a rear right air tube attached to the rear right teat cup; and
   wherein the left restricted orifice is in the front left short tube.

7. The air fork of claim 6, wherein the right restricted orifice is formed by a right plate covering an air tube connection end of the front right short tube, and the left restricted orifice is formed by a left plate covering an air tube connection end of the front left short tube.

8. The air fork of claim 7, wherein each of the right plate and the left plate has a hole in the center, wherein the hole has a diameter that is less than 60% of a diameter of each of the first main tube and the second main tube.

9. The air fork of claim 6, wherein the first air divider tube is generally perpendicular to the first main tube at a connection location between the first air divider tube and the first main tube, and the second air divider tube is generally perpendicular to the second main tube at a connection location between the second air divider tube and the second main tube.

10. The air fork of claim 9, wherein each of the front right short tube and the front left short tube curve about 90 degrees forward such that an air tube connection end of each of the front right short tube and the front left short tube is generally parallel with the longitudinal axis, and wherein each of the rear right short tube and the rear left short tube curve about 90 degrees rearward such that an air tube connection end of each of the rear right short tube and the rear left short tube is generally parallel with the longitudinal axis.

11. A milking cluster for milking a dairy animal having an udder with at least four teats, the milking cluster comprising:
   a claw having a plurality of inlets and an outlet, said claw being configured to be positioned under the udder and along a central longitudinal axis extending between the dairy animal's legs and generally parallel to a backbone of the dairy animal;

a four teat cups, each connected to a respective one of the four teats;

a plurality of milk tubes, each connecting a respective claw inlet to a respective teat cup;

an air fork configured to guide vacuum pressure generated by a pulsator to the four teat cups;

four air tubes, each connecting the air fork to a respective one of the four teat cups;

a first main pulsation line and a second main pulsation line, each connecting the air fork to the pulsator;

wherein the air fork comprises:

a first main tube extending along a longitudinal axis between a vacuum connection end configured to connect to the first main pulsation line and a second end that terminates in a first air divider tube;

wherein the first air divider tube is configured to connect between a front right teat cup on the front right teat and a rear left teat cup on the rear left teat to connect pulsation diagonally across the udder;

wherein the first air divider tube has a restricted orifice configured to reduce air flow between the first main tube and the front right teat cup compared to air flow between the first main tube and the rear left teat cup;

a second main tube extending along the longitudinal axis between a vacuum connection end configured to connect to the second main pulsation line and a second end that terminates in a second air divider tube;

wherein the second air divider tube is configured to connect between a front left teat cup on the front left teat and a rear right teat cup on rear right teat to connect pulsation diagonally across the udder; and wherein the second air divider tube has a restricted orifice configured to reduce air flow between the second main tube and the front left teat cup compared to air flow between the second main tube and the rear right teat cup.

12. The milking cluster of claim 11, wherein the restricted orifices are configured to cause a transition period between open and closed for each of the front right teat and the front left teat longer than a transition period between open and closed for each of the rear right teat and the rear left teat.

13. The milking cluster of claim 12, wherein the transition period for the front right teat and the front left teat is at least 20% longer than the transition period for the rear right teat and the rear left teat.

14. The milking cluster of claim 11, wherein a diameter of each of the first main tube, the first air divider tube, second main tube, and the second air divider tube is generally equal to a first diameter, wherein each of the restricted orifices has a diameter that is less than 60% of the first diameter.

15. The milking cluster of claim 11, wherein a diameter of each of the first main tube, the first air divider tube, the second main tube, and the second air divider tube is generally equal to a first diameter, wherein each of the restricted orifices has a diameter that is less than 45% of the first diameter.

16. The milking cluster of claim 11, wherein the first air divider tube includes a front right short tube configured to connect between the first main tube and a front right air tube attached to the front right teat cup and a rear left short tube having the restricted orifice and configured to connect between the first main tube and a rear left air tube attached to the rear left teat cup;

wherein the second air divider tube includes a front left short tube having the restricted orifice and configured to connect between the second main tube and a front left air tube attached to the front left teat cup and a rear right short tube configured to connect between the second main tube and a rear right air tube attached to the rear right teat cup.

17. The milking cluster of claim 16, wherein each of the restricted orifices are formed by a respective plate covering an air tube connection end of each of the front right short tube and the front left short tube.

18. The milking cluster of claim 17, wherein each plate has a hole in the center, wherein the hole has a diameter that is less than 60% of a diameter of each of the first main tube and the second main tube.

19. The milking cluster of claim 16, wherein the first air divider tube is generally perpendicular to the first main tube at a connection location between the first air divider tube and the first main tube, and the second air divider tube is generally perpendicular to the second main tube at a connection location between the second air divider tube and the second main tube.

20. The milking cluster of claim 19, wherein each of the front right short tube and the front left short tube curve about 90 degrees forward such that an air tube connection end of each of the front right short tube and the front left short tube is generally parallel with the longitudinal axis, and wherein each of the rear right short tube and the rear left short tube curve about 90 degrees rearward such that an air tube connection end of each of the rear right short tube and the rear left short tube is generally parallel with the longitudinal axis.

\* \* \* \* \*